United States Patent Office 3,709,840
Patented Jan. 9, 1973

3,709,840
CURING AGENT FOR EPOXY RESIN COMPRISING A CYCLIC ANHYDRIDE TREATED WITH AN AMINO ALCOHOL
Ronald L. Dehoff, Maplewood, N.J., assignor to R. T. Vanderbilt Company, Inc., New York, N.Y.
No Drawing. Filed Oct. 8, 1970, Ser. No. 79,362
Int. Cl. C08g 30/14
U.S. Cl. 260—2 EC
10 Claims

ABSTRACT OF THE DISCLOSURE

The specification relates to treating an anhydride with an amino alcohol. The treated anhydride is used as a curing agent for epoxy resins.

It is known to employ anhydrides as curing agents for epoxy resins. It is also known to use imidazoles and other compounds to promote the cure of epoxy resins with anhydrides.

In certain instances, there are advantages in curing the epoxy resin in the presence of both the anhydride and a promoter, such as an imidazole. For ease of operation and convenience and to avoid the necessity of precise weighing of a minor component, it would be desirable to premix the promoter either in the epoxy resin or in the anhydride. The promoter, however, will body, i.e., increase the viscosity of, the epoxy resin excessively if these two components are premixed. Therefore, it would be advantageous, under some circumstances, to premix the promoter, such as an imidazole, with the anhydride component.

During the production of a ring closure anhydride by means of the Diels-Alder reaction some unreacted maleic anhydride or the like is found in the product which must be separated by an expensive distillation process. Otherwise, if an imidazole or some other promoter is added to the anhydride containing the aforementioned maleic anhydride residue to form a solution, the residue reacts with the promoter to provide an undesirable dark sludge discoloring the anhydride and precipitating the promoter. In addition to discoloring the solution, the imidazole is deactivated after prolonged storage, and the rate of reaction is reduced when it is used with an epoxy resin.

It has now been discovered that the aforementioned problem can be overcome without distillation by treating the anhydride with an amino alcohol in order to neutralize the residue of maleic anhydride as defined hereafter. This residue generally ranges from about 0.1% to 1% based on the ring closure anhydride. In accordance with another embodiment of the invention, an imidazole or other promoter is added to the treated anhydride to provide a curing agent for epoxy resins.

As defined herein, an anhydride to be treated is one which has a ring closure, which has been formed from an addition reaction with maleic anhydride by the Diels-Alder technique and which has residual maleic anhydride. These anhydrides are well known in the art (U.S. Pat. No. 2,764,597, 2,959,599, 3,470,132, and 3,470,214). Suitable anhydrides, among others, are Nadic methyl anhydride (methyl endomethylenetetrahydrophthalic anhydride), Methendic anhydride (predominantly a mixture of endomethylenetetrahydrophthalic anhydride and methyl endomethylenetetrahydrophthalic anhydride), Chlorendic anhydride (hexachloro-endomethylenetetrahydrophthalic anhydride) and dodecenylsuccinic anhydride and mixtures thereof. The preferred anhydrides are tetrahydrophthalic anhydride, lower alkyl and dialkyl analogs thereof and liquid isomerized derivatives thereof (e.g., Vandride 2 of R. T. Vanderbilt Company, Inc.) and this includes the following compounds, among others:

$\Delta^4$-tetrahydrophthalic anhydride,
$\Delta^2$-tetrahydrophthalic anhydride,
$\Delta^3$-tetrahydrophthalic anhydride,
$\Delta^1$-tetrahydrophthalic anhydride,
4-methyl-$\Delta^4$-tetrahydrophthalic anhydride,
3-methyl-$\Delta^3$-tetrahydrophthalic anhydride,
3-methyl-$\Delta^4$-tetrahydrophthalic anhydride,
3-ethyl-$\Delta^4$-tetrahydrophthalic anhydride,
3,6-dimethyl-$\Delta^4$-tetrahydrophthalic anhydride,
4,5-dimethyl-$\Delta^4$-tetrahydrophthalic anhydride,
3,4-dimethyl-$\Delta^4$-tetrahydrophthalic anhydride,
4-methyl-$\Delta^1$-tetrahydrophthalic anhydride,
4-methyl-$\Delta^2$-tetrahydrophthalic anhydride,
4-methyl-$\Delta^3$-tetrahydrophthalic anhydride,
4-methyl-$\Delta^5$-tetrahydrophthalic anhydride,
4-methyl-$\Delta^6$-tetrahydrophthalic anhydride, and mixtures thereof.

An especially preferred ring closure anhydride is the one prepared by reacting isoprene, butadiene and maleic anhydride to provide an intermediate product which is subsequently rearranged with an organic sulfonic acid to provide a liquid product containing a mixture of isomerized tetrahydrophthalic anhydrides. In a first step, substantially stoichiometric amounts of certain (aliphatic or cycloaliphatic) conjugated dienes and maleic anhydride are used, generally with small excess of maleic anhydride. As defined in this invention, maleic anhydride includes its lower alkyl-substituted derivatives, such as methyl-, ethyl-, or cyclohexymaleic anhydride and it includes impurities, such as maleic acid, fumaric acid or the like.

The mixture is used containing the aforementioned conjugated dienes which are capable of reacting with maleic anhydride to undergo a Diels-Alder ring closure. The following additional aliphatic and cycloaliphatic conjugated dienes, among others, are suitable: piperylene, hexadiene, cyclopentadiene, 4-methylcyclopentadiene and myrcene and their $C_1$–$C_3$ alkyl-substituted homologs. The isoprene and butadiene may be introduced in the same stream containing about 75 to 95%, e.g., 85%, isoprene and about 25% to 5%, e.g., 15%, butadiene. Another component for providing the aforementioned intermediate is maleic anhydride as defined above. Although the maleic anhydride can be used in stoichiometric amounts, it is preferred to use slight excess. It is also advantageous to have phthalic anhydride as another compound in the preparation of the intermediate product; however, the phthalic anhydride can also be added in a subsequent step in the process. The addition reaction, known as the Diels-Alder technique, is employed to provide the intermediate product. Any suitable conditions may be employed. As a result of the above reaction, an intermediate product, which is a mixture of several compounds, is formed. The predominant compound therein is 4-methyl-$\Delta^4$-tetrahydrophthalic anhydride. A residue of maleic anhydride is also present in the intermediate product. The intermediate product with the anhydrides having a carbon-carbon double bond in the $\Delta^4$-position is then subjected to a rearrangement of the position of the double bond. This rearrangement may be effected by treating the intermediate product with an organic sulfonic acid. The temperature may be from about 120° C. to 175° C. with the time varying from about 10 to 1 hours. Generally the amount of sulfonic acid ranges from about 0.05% to 2% based upon the total end product. The organic sulfonic acid may be aliphatic or aromatic and the following acids, among others, are suitable: toluenesulfonic acid, xylene sulfonic acid, benzene sulfonic acid, dodecylbenzene sulfonic acid, alkane sulfonic acids, such as methane sulfonic acid, and mixtures thereof. After rearrangement, only a minor proportion of the product is 4-methyl-$\Delta^4$-tetrahydrophthalic anhydride since there has been rearrangement to the $\Delta^1$, $\Delta^2$, $\Delta^3$, $\Delta^5$, and $\Delta^6$ positions. The rearranged product, which has a residue of maleic anhydride, may have the following composition.

| Anhydrides: | Range (percent) |
| --- | --- |
| 4 - methyl - $\Delta^1$ - tetrahydrophthalic anhydride | 0 to 10 |
| 4 - methyl - $\Delta^2$ - tetrahydrophthalic anhydride | 10 to 20 |
| 4 - methyl - $\Delta^3$ - tetrahydrophthalic anhydride | 30 to 60 |
| 4 - methyl - $\Delta^4$ - tetrahydrophthalic anhydride | 0 to 10 |
| 4 - methyl - $\Delta^5$ - tetrahydrophthalic anhydride | 0 to 10 |
| 4 - methyl - $\Delta^6$ - tetrahydrophthalic anhydride | 10 to 20 |
| $\Delta^4$ - tetrahydrophthalic anhydride | 0 to 20 |
| $\Delta^1$-tetrahydrophthalic anhydride | 0 to 20 |
| $\Delta^2$-tetrahydrophthalic anhydride | 0 to 20 |
| Phthalic anhydride | 1 to 10 |
| Maleic anhydride | 0.1 to 1 |

The ring closure anhydride, such as the rearranged methyl-substituted tetrahydrophthalic anhydride described above, must be treated with an amino alcohol in order to remove the residual maleic anhydride as defined previously. The amino alcohol of this invention may be a primary, secondary or tertiary amino alcohol. The primary amino alcohol has the following generic structure:

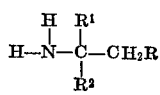

wherein $R^1$ and $R^2$ are each independently selected from the group consisting of hydrogen, $C_1$ to $C_4$ alkyl, hydroxy and hydroxyalkyl having 1 to 4 carbon atoms but at least one $R^1$ and $R^2$ group must be other than hydrogen; R is hydrogen, hydroxy or $C_1$ to $C_4$ alkyl. The secondary and tertiary amino alcohols have the following generic structure:

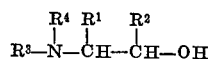

wherein $R^1$ and $R^2$ are each independently selected from the group consisting of hydrogen, $C_1$ to $C_4$ alkyl and hydroxyalkyl having 1 to 4 carbon atoms and $R^3$ and $R^4$ are each independently selected from the group consisting of hydrogen, $C_1$ to $C_4$ alkyl, aminoalkyl having 1 to 4 carbon atoms and hydroxyalkyl having 1 to 4 carbon atoms but when $R^1$ and $R^2$ are both hydrogen, at least one $R^3$ and $R^4$ group must be other than hydroxyethyl and hydrogen. The following compounds, among others, are within the scope of the invention: tris (hydroxymethyl) aminomethane, aminoethylpropanediol, aminomethylpropanol, aminobutanol, aminomethylethanolamine, t-butyldiethanolamine and dimethylethanolamine.

The amount of amino alcohol used in the treatment is generally about 0.1 to 3 parts, preferably about 0.5 to 1.5 parts, per 100 parts of anhydride containing the maleic anhydride residue. The temperature for the reaction will vary depending on the amino alcohol used. However, it is usually performed at elevated temperatures, such as about 120° to 160° C.

The aforementioned treated anhydride may be used as a curing agent for epoxy resin. The treated anhydride is generally employed in conjunction with a promoter. Suitable promoters are those commonly used for the curing of epoxy resins with ring closure anhydrides. This includes the following promoters, among others: tertiary amines, such as benzyl dimethylamine and tris (dimethylaminomethyl) phenol and salts thereof; and Lewis acids, such as boron trifluoride and its adducts; and Lewis bases, such as imidazoles and alkyl-substituted imidazoles, adducts thereof and salts thereof.

It is preferred to add an imidazole, to the aforementioned treated anhydride. As defined herein an imidazole includes imidazole compounds, addition products thereof and salts thereof as described herebelow which is liquid between about 10° to 200° C.

If the imidazole component is a compound, it is within the scope of the following generic structure:

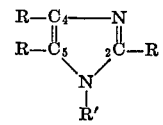

wherein each R is independently selected from the group consisting of hydrogen, $C_1$ to $C_4$ alkyl and phenyl which as defined herein includes substituted phenyl and R' is selected from the group consisting of hydrogen and $C_1$ to $C_4$ alkyl. This includes the following specific compounds among others:

imidazole;
2-methylimidazole;
2-ethyl-4-methylimidazole;
2-ethyl-5-methylimidazole;
2-methyl-4-ethylimidazole;
2-methyl-5-ethylimidazole;
1-methylimidazole;
1-butylimidazole;
2,4-dimethylimidazole;
2,5-dimethylimidazole;
4-butyl-5-ethylimidazole;
2-butyl-4-methylimidazole;
2-butyl-5-methylimidazole;
2,4,5-tripropylimidazole;

and mixtures thereof. These imidazole compounds are well known in the art.

The imidazole component may also be an addition product of imidazole or substituted imidazole (as defined by the aforementioned generic structure) and a monoepoxide having 2 to 13 carbon atoms. This includes the following compounds among others: ethylene oxide, propylene oxide, butylene oxide, butyl glycidyl ether, phenyl glycidyl ether, cresyl glycidyl ether and p-tertiarybutyl phenyl glycidyl ether. Therefore, one or more of the aforementioned substituted imidazoles can be reacted with a monoepoxide, e.g., propylene oxide, or unsubstituted imidazole can be reacted with a monoepoxide, e.g., propylene oxide. The substituted imidazole, moreover, can be mixed with unsubstituted imidazole and this mixture can be reacted with propylene oxide or the like. The imidazole reactant may contain about 0% to 100 mole percent of substituted imidazole and about 100% to 0 mole percent of unsubstituted imidazole. A specific mixture may contain about 10 to 80 mole percent of substituted imidazole and about 90 to 20 mole percent of unsubstituted imidazole.

In order to form the addition product, propylene oxide or other monoepoxide is reacted, for instance, in approximately stoichiometric amounts with the substituted imidazole alone or unsubstituted imidazole alone or mixtures thereof. The reaction is conducted at elevated temperatures which are generally above the melting point of the imidazoles, such as about 100° to 150° C., preferably about 110° to 130° C. The time will vary accordingly, such as about 1 to 8 hours, in order to form a liquid reaction product.

The imidazole component may be a salt formed by reacting imidazole, a substituted imidazole or an imidazole addition product, which are described heretofore, with any suitable compounds, such as an organic or inorganic acid, e.g., phosphoric acid, azelaic acid, lactic acid and monocarboxylic acids having 1 to 8 carbon atoms (formic acid, acetic acid, propionic acid and the like). This salt can be prepared by any suitable method. One method, among others, is adding the imidazole component to the acid slowly and in approximately stoichiometric amounts at about 70° to 150° C. in an open beaker containing a magnetic stirrer.

A curing agent for epoxy resin may be formed by mixing about 0.1 to 5 parts, preferably about 0.5 to 2 parts, of a promoter, such as an imidazole, to 100 parts of the treated anhydride. Any suitable method can be used to provide this mixture.

The curing agent, which may contain both the treated anhydride and promoter, may be incorporated into the epoxy resin by any acceptable procedure. This curing agent containing both components is also used in about stoichiometric amounts, usually about 10 to 150 parts per 100 parts of resin (phr.), preferably about 30 to 140 phr.

The epoxy resins, which are cured with the curing agents of this invention, are well known in the art [Polymer Processes, Schildkneckt, pages 429–474 (1956)]. For instance, it is known to react epichlorohydrin and bisphenol-A, i.e., 2,2-bis-(p-hydroxyphenyl)propane, to produce the following structure:

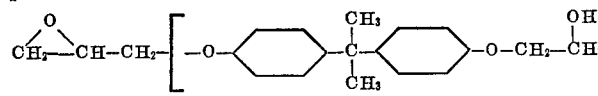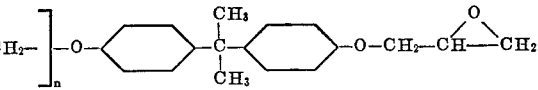

The epoxy resin can also be an aliphatic ether. Glycerin based epoxide resin, which is the epoxide resin formed from epichlorohydrin and glycerin (Epon 812 from Shell Chemical Company or Vanoxy 112 from R. T. Vanderbilt Company, Inc.), is an example of an aliphatic epoxide resin. Another example of an aliphatic resin is glycidyl ester, Epon 871 or Vanoxy 171, which cures to a flexible or rubbery resin. Other specific examples of epoxy resins are among others, glycidyl ethers of novalac resins derived from polyhydric phenols by condensation with an aldehyde, followed by reaction with epichlorohydrin in the presence of alkali and those disclosed in U.S. Pat. Nos. 3,394,105, 3,470,132 and 3,477,981 which are incorporated herein by reference. Vicinal resins, such as 1,2-epoxy resins, are preferred.

The epoxy resin may also contain minor amounts of optional ingredients, such as reactive diluents, organic solvents, fillers, pigments, crystallization inhibitors (e.g., Vantard of R. T. Vanderbilt Company, Inc.) and the like. By reactive diluents are meant those monoepoxides and other components commonly introduced to change the properties of the cured resins derived from the diglycidyl ether of bisphenol-A. They include such components as butyl glycidyl ether, phenyl glycidyl ether, cresyl glycidyl ether, allyl glycidyl ether and gamma-butyrolactone. Also included are such products as the epoxide derived from a long chain aliphatic alcohol and known as "Epoxide 7" of Procter & Gamble or Vanoxy RD-707 of R. T. Vanderbilt Company, Inc., and the epoxy ester(s) of mixed aliphatic $C_9$–$C_{11}$ monocarboxylic acids consisting principally of acids having a tertiary carbon alpha to the carboxyl and known as "Cardura E" of Shell Chemical Company.

Organic solvents which may be used include lower aromatic hydrocarbons such as benzene, toluene and xylene; lower aliphatic and cycloaliphatic ketones such as acetone, methyl ethyl ketone, diisobutyl ketone, cyclohexanone and methylcyclohexanone; and aliphatic esters of lower monocarboxylic acids such as ethyl acetate, isopropyl acetate, butyl acetate and the like. These are nonreactive toward the glycidyl ether.

Fillers may also be used in conjunction with the epoxy resins. This includes the following among others: talc, silica, alumina and calcium carbonate.

The mixture of epoxy resin, curing agent of the invention and any other ingredients may be cured by any acceptable procedure to form a finished epoxy product. One procedure is to cure at elevated temperatures. The time for curing varies and it is dependent upon the temperature and other conditions, such as humidity. For instance, at a temperature of about 85° to 150° C. the time may be about 1 to 5 hours.

Thus, in accordance with this invention, the ring closure anhydride is treated with the amino alcohol without any undesirable side effects. The subsequent addition of a promoter, such as an imidazole, does not discolor the anhydride substantially nor does the added imidazole form a sludge or precipitate. Epoxy resins with the treated anhydride and promoter can be utilized in any manner known in the art, such as a film applied to paper, glass, metal and wooden substrates as protective coatings, adhesives and sealants, and in structural application, such as potting, casting and laminating.

The following examples are submitted to illustrate but not to limit this invention. Unless otherwise indicated, all parts and percentages in the specification and claims are based upon weight.

EXAMPLE I

A liquid isomerized anhydride was prepared by charging maleic anhydride (3800 lb.), di-tertiary-butyl-4-cresol (7 lb.) and phthalic anhydride (450 lb.) to a dried, steam-jacketed, nitrogen-filled reactor fitted with a stirrer. Steam was applied to melt the maleic anhydride and stirring was started after the temperature of the pot exceeded 60° C. Addition of 2237 lbs. isoprene under pressure was started, and when the pot temperature reached 90° C., the flow was adjusted to maintain the temperature between 90 and 100° C. with full cooling. Care was taken to keep the temperature above 60° C. to prevent solidification of the mass. Stirring was continued for 15 minutes at 90–100° C. after addition of isoprene was complete, and then 230 lbs. butadiene was introduced at the same temperature and stirred for 15 minutes. Further increments of maleic anhydride and isoprene were then added as required in order to maintain a slight excess of maleic anhydride to provide an intermediate product.

Subsequently, p-toluenesulfonic acid (14 lbs.) was added to the intermediate product under nitrogen and the temperature raised to effect isomerization. The mass was stirred at 148°–155° C. for four hours or until a clear point of 25° C. or lower was obtained to provide a rearranged (isomerized) product.

A liquid imidazole adduct was prepared by heating imidazole 68 grams (1 mole) and propylene oxide 68 grams (1.17 moles) together in a tared 400 ml. beaker equipped with a magnetic stirrer on a hot plate. The beaker is capable of being cooled by cold water to keep the temperature below 65° C. At the end of 50 minutes, the tared beaker showed a loss of 27 grams, so an additional 20 grams of propylene oxide were added to supply that which had been lost. The reaction was exothermic and the exotherm was allowed to carry the temperature to 130° C. The weight of the sirupy product was 124 grams, or a yield of 98.3% based on imidazole. The specific gravity of the product was 1.13; viscosity $Z_1$–$Z_2$ Gardner (corresponding to 3200–4300 cps.); and the color, 12 on the Hellige standard.

Solutions A, B, C and D were prepared from separate portions of the above liquid isomerized anhydride curing agent which were heated to 150° C. As indicated in Table 1, various amounts of tris amino, i.e., tris (hydroxymethyl) aminomethane, were added to treat the anhydride. After cooling to 65° C., the above imidazole adduct was added to the treated anhydride. A control solution was also prepared. The color (Gardner) was determined as shown in Table 1.

TABLE 1

| Solution | A | B | C | D | Control |
|---|---|---|---|---|---|
| Anhydride, parts | 100 | 100 | 100 | 100 | 100 |
| Tris amino, parts | 0.5 | 1.0 | 1.5 | 2.0 | |
| Imidazole adduct, parts | 1.0 | 1.0 | 1.0 | 1.0 | 1.0 |
| Color | 12 | 11 | 10 | 10 | 16 |

Each of the solutions above was blended with separate portions of Vanoxy 126 epoxy resin of R. T. Vanderbilt Company, Inc. a moderately highly purified diglycidyl ether of bisphenol (WPE of 185). Each portion was then poured into heat distortion bar molds and cured for 2 hours at 85° C. and subsequently for 3 hours at 150° C. The results are indicated in Table 2.

TABLE 2

| Formulation | 1 | 2 | 3 | 4 | 5 |
|---|---|---|---|---|---|
| Epoxy resin, parts | 100 | 100 | 100 | 100 | 100 |
| Solution: | | | | | |
| A, parts | 85 | | | | |
| B, parts | | 85 | | | |
| C, parts | | | 85 | | |
| D, parts | | | | 85 | |
| control, parts | | | | | 85 |
| Heat distortion temperature (° C.) | 139/137 | 138/138 | 138/138 | 136/137 | 141/139 |

This example demonstrates that the treated anhydride of the invention forms a superior color when mixed with an imidazole and that this curing agent is suitable for curing epoxy resins.

EXAMPLE II

The liquid isomerized anhydride (1000 grams) of Example I was heated at about 150° C. in a beaker and tris amino was dissolved therein with stirring. After cooling to room temperature, the treated anhydride was blended with various promoters. Controls were also provided with anhydride. The color (Gardner) of each blend was noted and it is listed in Table 3.

TABLE 3

| Formulation | A | B | C | D | E | F |
|---|---|---|---|---|---|---|
| Epoxy resin, g | 50.0 | 50.0 | 50.0 | 50.0 | 50.0 | 50.0 |
| Untreated anhydride, g | 42.5 | | 42.5 | | 42.5 | |
| Treated anhydride, g | | 43.0 | | 43.0 | | 43.0 |
| Tris (dimethylaminomethyl) phenol, g | 1.0 | 1.0 | | | | |
| Benzyldimethylamine, g | | | 1.0 | 1.0 | | |
| Imidazole adduct of Example I, g | | | | | 0.5 | 0.5 |
| Color | 16 | 6 | 12 | 6 | 10 | 6 |
| Heat distortion temperature (° C.) after 30 minutes | 96 | 98 | 93 | 104 | 78 | 91 |

Each blend was used to cure portions of the epoxy resin of Example I. The cure rate was determined by pouring each portion into heat distortion bars maintained at about 100° for 30 minutes. The heat distortion temperatures were determined as in Example II and are listed in Table 3.

It is evident from this example that the treated anhydride of the invention when combined with various promoters provides superior color and provides an acceptable degree of cure for epoxy resins.

EXAMPLE III

The liquid isomerized anhydride (600 grams) of Example I was treated 120–125° C. with aminoethylpropanediol. The treated anhydride was mixed at 100° C. with various imidazole compounds indicated in Table 4. Each mixture was used to cure the epoxy resin of Example I and the heat distortion temperature was determined as in Example II. Table 4 lists the results.

TABLE 4

| Formulation | 1 | 2 | 3 | 4 | 5 |
|---|---|---|---|---|---|
| Epoxy resin, parts | 100 | 100 | 100 | 100 | 100 |
| Treated anhydride, parts | 86 | 86 | 86 | 86 | 86 |
| Imidazole adduct of Example I, parts | 1.0 | | | | |
| N-methylimidazole, parts | | 0.67 | | | |
| 2-ethyl-4-methylimidazole, parts | | | 0.85 | | |
| Imidazole, parts | | | | 0.5 | |
| 2-methylimidazole, parts | | | | | 0.67 |
| Heat distortion temperature (° C.) | 140 | 142 | 138 | 140 | 140 |

Example III shows that various imidazole compounds can be combined with treated anhydrides to provide a curing agent for epoxy resins.

EXAMPLE IV

The procedure of Example III was repeated except that the anhydride was treated with tris amino. Two other imidazole compounds, which are listed in Table 5, were combined with the treated anhydride. The results are also listed in Table 5.

TABLE 5

| Formulation | G | H |
|---|---|---|
| Epoxy resin, parts | 100 | 100 |
| Treated anhydride, parts | 86 | 86 |
| N-methyl imidazole azelate, parts | 1.5 | |
| Azelate of imidazole adduct of Example I, parts | | 1.7 |
| Heat distortion temperature (° C.) | 142 | 137 |

The two imidazole compounds of this example may be combined with treated anhydrides to provide satisfactory curing agents for epoxy resins.

EXAMPLE V

The liquid isomerized anhydride of Example I was treated at 120° C., as shown in Table 6 with various amino alcohols (1 gram per 100 grams of anhydride).

TABLE 6

| Formulation | A | B | C | D | E | F | G |
|---|---|---|---|---|---|---|---|
| Anhydride, g | 100 | 100 | 100 | 100 | 100 | 100 | 100 |
| Aminomethylpropanol, g | 1 | | | | | | |
| Aminobutanol, g | | 1 | | | | | |
| Tertbutyldiethanolamine, g | | | 1 | | | | |
| Aminomethylethanolamine, g | | | | 1 | | | |
| Dimethylethanolamine, g | | | | | 1 | | |
| Aminoethylpropanediol, g | | | | | | 1 | |
| Tris amino, g | | | | | | | 1 |
| Imidazole adduct, g | 1.2 | 1.2 | 1.2 | 1.2 | 1.2 | 1.2 | 1.2 |
| Hear distortion temperature (° C.) | 138/137 | 138/136 | 130/129 | 133/132 | 133/131 | 139/138 | 141/140 |

Each solution therefrom was cooled to 65° C. and 1.2 grams of the imidazole adduct of Example I were dissolved in each to provide curing agents. All of these solutions were clear.

Each curing agent (88 parts) was used to cure epoxy resin (100 parts) of Example I. The heat distortion temperatures, which were determined as in Example II, are listed in Table 6.

From this example, it is evident that amino alcohols within the scope of the invention can be used to treat an anhydride and that the treated anhydride can be employed in the curing of epoxy resins.

Having set forth the general nature and specific embodiments of the present invention, the true scope is now particularly pointed out in the appended claims.

What is claimed is:

1. A process for curing vicinal epoxy resins which comprises reacting 100 parts of a ring closure anhydride which is obtained by the Diels-Alder technique and which has residual maleic anhydride with about 0.1 to 3 parts of amino alcohol which is selected from the group consisting of a primary alcohol, a secondary alcohol or a tertiary amino alcohol at a temperature sufficient to effect the reaction; said primary alcohol having the generic structure:

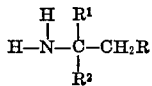

wherein $R^1$ and $R^2$ are each independently selected from the group consisting of hydrogen, $C_1$ to $C_4$ alkyl, hydroxy and hydroxyalkyl having 1 to 4 carbon atoms but at least one $R^1$ and $R^2$ group must be other than hydrogen; R is hydrogen, hydroxy or $C_1$ to $C_4$ alkyl; said secondary and tertiary amino alcohol having the generic structure:

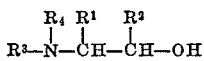

wherein $R^1$ and $R^2$ are each independently selected from the group consisting of hydrogen, $C_1$ to $C_4$ alkyl and hydroxyalkyl having 1 to 4 carbon atoms and $R^3$ and $R^4$ are each independently selected from the group consisting of hydrogen, $C_1$ to $C_4$ alkyl, aminoalkyl having 1 to 4 carbon atoms and hydroxyalkyl having 1 to 4 carbon atoms but when $R^1$ and $R^2$ are both hydrogen, at least one $R^3$ and $R^4$ group must be other than hydroxyethyl and hydrogen; blending said anhydride reacted with amino alcohol with an epoxy resin and a promoter therefor; and curing said blend to provide a cured resin.

2. The process according to claim 1 in which the anhydride is liquid isomerized anhydride comprising about 0%–10% 4-methyl - $\Delta^1$ - tetrahydrophthalic anhydride, about 10%–20% 4-methyl-$\Delta^2$-tetrahydrophthalic anhydride, about 30%–60% 4-methyl-$\Delta^3$-tetrahydrophthalic anhydride, about 0%–10% 4-methyl-$\Delta^4$-tetrahydrophthalic anhydride, about 0%–10% 4-methyl-$\Delta^5$-tetrahydrophthalic anhydride, about 10%–20% 4-methyl-$\Delta^6$-tetrahydrophthalic anhydride, about 0%–20% $\Delta^4$-tetrahydrophthalic anhydride, about 0%–20% $\Delta^1$-tetrahydrophthalic anhydride, about 0%–20% $\Delta^2$-tetrahydrophthalic anhydride, about 1%–10% phthalic anhydride and about 0.1%–1% maleic anhydride.

3. The process according to claim 1 in which the amino alcohol is tris(hydroxymethyl) aminomethane.

4. The process according to claim 1 in which the amino alcohol is aminoethylpropanediol.

5. The process according to claim 1 in which the promoter is an imidazole.

6. A composition which comprises vicinal epoxy resin and a curing agent comprising a promoter and a ring closure anhydride which is obtained by the Diels-Alder technique and which to neutralize residual maleic anhydride therein has been reacted previously with about 0.1 to 3 parts per 100 parts of anhydride of an amino alcohol which is selected from the group consisting of a primary alcohol, a secondary alcohol or a tertiary amino alcohol at a temperature sufficient to effect the reaction; said primary alcohol having the generic structure:

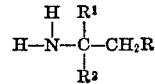

wherein $R^1$ and $R^2$ are each independently selected from the group consisting of hydrogen, $C_1$ to $C_4$ alkyl, hydroxy and hydroxyalkyl having 1 to 4 carbon atoms but at least one $R^1$ and $R^2$ group must be other than hydrogen; R is hydrogen, hydroxy or $C_1$ to $C_4$ alkyl; said secondary and tertiary amino alcohol having the generic structure:

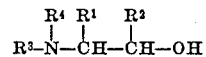

wherein $R^1$ and $R^2$ are each independently selected from the group consisting of hydrogen, $C_1$ to $C_4$ alkyl and hydroxyalkyl having 1 to 4 carbon atoms and $R^3$ and $R^4$ are each independently selected from the group consisting of hydrogen, $C_1$ to $C_4$ alkyl, aminoalkyl having 1 to 4 carbon atoms and hydroxyalkyl having 1 to 4 carbon atoms but when $R^1$ and $R^2$ are both hydrogen, at least one $R^3$ and $R^4$ group must be other than hydroxyethyl and hydrogen.

7. The composition according to claim 6 in which the anhydride is liquid isomerized anhydride comprising about 0%–10% 4-methyl-$\Delta^1$-tetrahydrophthalic anhydride, about 10%–20% 4-methyl - $\Delta^2$ - tetrahydrophthalic anhydride, about 30%–60% 4-methyl-$\Delta^3$-tetrahydrophthalic anhydride, about 0%–10% 4-methyl-$\Delta^4$-tetrahydrophthalic anhydride, about 0%–10% 4-methyl-$\Delta^5$-tetrahydrophthalic anhydride, about 10%–20% 4-methyl-$\Delta^6$-tetrahydrophthalic anhydride, about 0%–20% $\Delta^4$-tetrahydrophthalic anhydride, about 0%–20% $\Delta^1$-tetrahydrophthalic anhydride, about 0%–20% $\Delta^2$-tetrahydrophthalic anhydride, about 1%–10% phthalic anhydride and about 0.1%–1% maleic anhydride.

8. The composition according to claim 6 in which the amino alcohol is tris(hydroxymethyl) aminomethane.

9. The composition according to claim 6 in which the amino alcohol is aminoethylpropanediol.

10. The composition according to claim 6 in which the promoter is an imidazole.

References Cited

UNITED STATES PATENTS 3,329,652  7/1967  Christie _____ 260—47

OTHER REFERENCES

Handbook of Epoxy Resin, Lee & Neville, 1967, pp. 73 thru 7-7 and 14–11).

WILLIAM H. SHORT, Primary Examiner

T. PERTILLA, Assistant Examiner

U.S. Cl. X.R.

117—124 E, 127, 148, 155 R, 161 ZB; 161—184; 260—37 Ep, 47 EC, 59, 78.4 Ep